United States Patent Office 3,000,936
Patented Sept. 19, 1961

---

3,000,936
4,4-DINITRO 1,7-HEPTANEDIOYLCHLORIDE AND METHOD OF MAKING IT
Levonna Herzog, Rutherford, N.J., assignor, by mesne assignments, to Aerojet-General Corporation, Cincinnati, Ohio, a corporation of Ohio
No Drawing. Filed Nov. 30, 1950, Ser. No. 198,492
6 Claims. (Cl. 260—544)

This invention relates to a new composition of matter and the method for making the same, and more specifically to 4,4-dinitro-1,7-heptanedioyl chloride.

In a copending application by Marvin H. Gold et al., Serial No. 198,491, filed November 30, 1950, now Patent No. 2,918,489, and assigned to the same assignee as the present invention, there has been disclosed the formation of a new compound 4,4-dinitro-1,7-heptanedioic acid. The present invention is directed to the formation of a new chemical compound from 4,4-dinitro-1,7-heptanedioic acid.

4,4-dinitro-1,7-heptanedioic acid referred to in the above-identified application can be formed as follows: A solution of potassium dinitromethane in water is added to methyl acrylate and the mixture stirred at temperatures between 35° and 45° C. The resulting product is then extracted with ether, the ether removed by evaporation, and the product, dimethyl 4,4-dinitro-1,7-heptanedioate is obtained. The crude dimethyl 4,4-dinitro-1,7-heptanedioate is mixed with diluted hydrochloric acid and the mixture refluxed until the solution becomes homogeneous. In cooling the product is allowed to crystallize and solid material filtered off. This product is 4,4-dinitro-1,7-heptanedioic acid.

An alternate method for the formation of the dimethyl 4,4-dinitro-1,7-heptanedioate also disclosed in the above-identified specification is treatment of potassium dinitroethanol dissolved in water with methylacrylate. The above mixture is stirred for a prolonged period of time and the organic layer that separates out at the bottom of the reaction vessel is dissolved in ether, extracted and evaporated, leaving behind a crude dimethyl-4,4-dinitro-1,7-heptanedioate. Another method for the formation of dimethyl-4,4-dinitro-1,7-heptanedioate also disclosed is the reaction of 2,2-dinitro 1,3-propanediol with methyl acrylate in the presence of potassium hydroxide solution. The reaction is continued until complete and dimethyl 4,4-dinitro-1,7-heptanedioate crystallizes out.

The object of this invention is to synthesize 4,4-dinitroheptanedioyl chloride

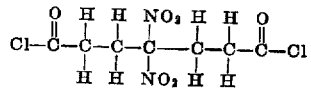

This compound is prepared by treating 4,4-dinitro-1,7-heptanedioic acid with either thionyl chloride or phosphorous pentachloride. The reactions involved in the preparation of this compound are as follows:

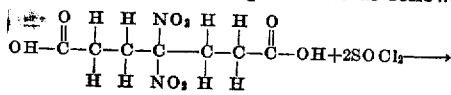

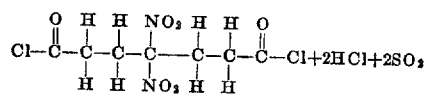

The compound may be also formed by employing $PCl_3$, $POCl_3$, $PCl_5$ or mixtures of the four compounds.

The preferred procedure for preparing the compound is as follows:

750 grams (3 M) of 4,4-dinitro-1,7-heptanedioic acid are placed in a flask equipped with a heating mantle, thermometer and a reflux condenser. 1300 ml. (18M) of thionyl chloride are added to the 4,4-dinitroheptanedioic acid. The solution is slowly heated to 50–55° C. and kept at this temperature until all of the dinitro dicarboxylic acid is dissolved. After solution the flask is heated to the refluxing temperature which is normally between 73°–78° C. and refluxing is continued for a period of approximately 16 hours. The solution is cooled and filtered through a fritted glass funnel. On cooling to −20° C. white crystals of dinitroheptanedioic acid chloride crystallize. The crystals are filtered and washed with two 100 ml. portions of normal hexane and dried in a desiccator over potassium hydroxide. The yield of dry crystals is from 730–825 grams or between 85–96% by weight based on the weight of 4,4-dinitro-1,7-heptanedioic acid used.

4,4-dinitroheptanedioyl chloride is a colorless crystalline compound which melts at 56–57° C.

In the event that $PCl_5$, which is a solid, is substituted for $SOCl_2$ a reaction will take place between the $PCl_5$ and the 4,4-dinitro-1,7-heptanedioic acid. This reaction takes place rapidly and exothermically at room temperature, therefore, no heating is required and $POCl_3$ is formed. From this point onward the procedure remains the same as described above.

This compound serves as a useful intermediate as disclosed in assignee's copending application, and now abandoned, No. 198,493 filed concurrently with the present application and may be employed in synthesizing compounds which may be copolymerized with alcohols to form solid propellants.

I claim:
1. A new composition of matter comprising 4,4-dinitro-1,7-heptanedioyl chloride

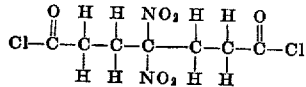

2. The method of synthesizing 4,4-dinitro-1,7-heptanedioyl chloride which comprises mixing 4,4-dinitro-1,7-heptanedioic acid with a substance selected from the group consisting of $SOCl_2$, $PCl_3$, $POCl_3$, $PCl_5$ and mixtures thereof, heating the mixture slowly to a temperature of about 55° C., holding the mixture at a temperature of 55° C., until all of the acid has gone into solution for a sufficient time to permit substantially complete reaction, cooling the solution to room temperature, filtering the solution, lowering the temperature of the filtrate to about −20° C. thereby crystallizing 4,4-dinitro-1,7-heptanedioyl chloride, and filtering said crystals.

3. The method of synthesizing 4,4-dinitro-1,7-heptanedioyl chloride which comprises mixing 4,4-dinitro-1,7-heptanedioic acid with thionyl chloride, heating the mixture slowly to a temperature of about 55° C., holding the mixture at a temperature of 55° C. until all the acid has gone into solution, heating and refluxing the solution for a sufficient time to permit substantially complete reaction, cooling the solution to room temperature, filtering the solution, lowering the temperature of the filtrate to about −20° C., thereby crystallizing 4,4-dinitropheptanedioyl chloride, and filtering said crystals.

4. The method of synthesizing 4,4-dinitro-1,7-heptanedioyl chloride which comprises mixing 4,4-dinitro-1,7-heptanedioic acid with $POCl_3$, heating the mixture slowly to a temperature of about 55° C., holding the mixture at a temperature of 55° C. until all the acid has gone into solution, heating and refluxing the solution for a sufficient time to permit substantially complete reaction, cooling the solution to room temperature, filtering the solution, lowering the temperature of the filtrate to about −20° C. thereby crystallizing 4,4-dinitroheptanedioyl chloride, and filtering said crystals.

5. The method of synthesizing 4,4-dinitro-1,7-heptanedioyl chloride which comprises mixing 4,4-dinitro-1,7-heptanedioic acid with PCl$_5$, allowing reaction to proceed at room temperature and then holding the mixture at a temperature of 55° C. until all the acid has gone into solution, heating and refluxing the solution for a sufficient time to permit substantially complete reaction, cooling the solution to room temperature, filtering the solution, lowering the temperature of the filtrate to about −20° C. thereby crystallizing 4,4-dinitroheptanedioyl chloride, and filtering said crystals.

6. The method of synthesizing 4,4-dinitro-1,7-heptanedioyl chloride which comprises mixing 4,4-dinitro-1,7-heptanedioic acid with PCl$_3$, heating the mixture slowly to a temperature of about 55° C., holding the mixture at a temperature of 55° C. until all the acid has gone into solution, heating and refluxing the solution for a sufficient time to permit substantially complete reaction, cooling the solution to room temperature, filtering the solution, lowering the temperature of the filtrate to about −20° C. thereby crystallizing 4,4-dinitroheptanedioyl chloride, and filtering said crystals.

References Cited in the file of this patent

Herzog et al.: J.A.C.S., vol. 73, pp. 749–741 (1951).